(12) United States Patent
Tsubakino

(10) Patent No.: US 11,719,309 B2
(45) Date of Patent: Aug. 8, 2023

(54) TOOTHED BELT

(71) Applicant: BANDO CHEMICAL INDUSTRIES, LTD., Kobe (JP)

(72) Inventor: Kazuyuki Tsubakino, Kobe (JP)

(73) Assignee: BANDO CHEMICAL INDUSTRIES, LTD., Kobe (JP)

( * ) Notice: Subject to any disclaimer, the term of this patent is extended or adjusted under 35 U.S.C. 154(b) by 0 days.

(21) Appl. No.: 18/090,338

(22) Filed: Dec. 28, 2022

(65) Prior Publication Data
US 2023/0141466 A1 May 11, 2023

Related U.S. Application Data

(63) Continuation of application No. PCT/JP2021/024922, filed on Jul. 1, 2021.

(30) Foreign Application Priority Data

Jul. 3, 2020 (JP) .................................. 2020-115532

(51) Int. Cl.
*F16G 1/28* (2006.01)
*F16H 7/02* (2006.01)
(Continued)

(52) U.S. Cl.
CPC ................ *F16G 1/28* (2013.01); *D02G 3/16* (2013.01); *D02G 3/26* (2013.01); *D02G 3/447* (2013.01);
(Continued)

(58) Field of Classification Search
CPC ..... F16G 1/28; F16G 1/08; F16G 1/14; F16G 1/06; F16G 1/16; F16G 1/10; F16H 7/023; B02G 3/447
(Continued)

(56) References Cited

U.S. PATENT DOCUMENTS 4,302,197 A * 11/1981 Kimura .................... F16G 1/28
139/420 R
5,807,194 A * 9/1998 Knutson ................ B29D 29/08
474/237
(Continued)

FOREIGN PATENT DOCUMENTS

| CN | 108350644 A | 7/2018 |
| JP | 2005-024075 A | 1/2005 |
| JP | 2010-096229 A | 4/2010 |

OTHER PUBLICATIONS

JP Office Action dated Sep. 14, 2021 as received in Application No. 2021539437.
(Continued)

*Primary Examiner* — Henry Y Liu
(74) *Attorney, Agent, or Firm* — Maschoff Brennan

(57) ABSTRACT

A transmission system using a toothed belt includes a belt body made of elastomer and a core wire made of carbon fiber and provided so as to be embedded in the belt body and form a helix having a pitch in a belt width direction. The belt body includes a flat band portion having a horizontally long rectangular cross section and a plurality of tooth portions integrally provided on an inner peripheral side of the flat band portion. A belt tension T0.2 per belt width of 1 mm when a belt elongation rate is 0.2% is 70 N/mm or more, an amount of backlash between the toothed belt and a toothed pulley is 0.10 mm or more and less than 0.65 mm, a hardness of the belt body is 89° or more in JIS K 6253 Durometer Type A, and a surface dynamic friction coefficient is 1.5 or less.

5 Claims, 5 Drawing Sheets

(51) Int. Cl.
*F16G 1/10* (2006.01)
*F16G 1/16* (2006.01)
*D02G 3/26* (2006.01)
*D02G 3/44* (2006.01)
*D02G 3/16* (2006.01)

(52) U.S. Cl.
CPC ............. *F16G 1/10* (2013.01); *F16G 1/16* (2013.01); *F16H 7/023* (2013.01); *D10B 2101/12* (2013.01); *D10B 2505/02* (2013.01)

(58) Field of Classification Search
USPC .......................................... 474/205
See application file for complete search history.

(56) References Cited

U.S. PATENT DOCUMENTS

| | | | | |
|---|---|---|---|---|
| 5,971,879 | A * | 10/1999 | Westhoff | F16G 1/28 474/260 |
| 6,572,505 | B1 * | 6/2003 | Knutson | F16G 1/10 474/263 |
| 7,056,249 | B1 * | 6/2006 | Osako | F16G 1/06 474/260 |
| 7,985,152 | B2 * | 7/2011 | Di Meco | C08L 15/005 474/271 |
| 8,357,065 | B2 * | 1/2013 | Duke, Jr. | B29D 29/08 474/205 |
| 8,568,260 | B2 * | 10/2013 | Baldovino | F16G 1/28 474/271 |
| 8,871,329 | B2 * | 10/2014 | Yoshida | F16G 1/28 428/167 |
| 9,366,314 | B2 * | 6/2016 | Motozaki | D03D 15/47 |
| 2001/0051555 | A1 * | 12/2001 | Isshiki | F16G 1/28 474/263 |
| 2002/0179228 | A1 * | 12/2002 | Gibson | B32B 7/12 156/137 |
| 2006/0079362 | A1 * | 4/2006 | Tomobuchi | F16G 1/28 474/260 |
| 2007/0060431 | A1 * | 3/2007 | Hineno | F16G 5/06 474/263 |
| 2007/0178792 | A1 * | 8/2007 | Yoshida | F16G 1/28 442/293 |
| 2007/0281814 | A1 * | 12/2007 | Baldovino | D02G 3/447 474/205 |
| 2008/0318719 | A1 * | 12/2008 | Izu | F16G 1/28 474/205 |
| 2010/0120566 | A1 * | 5/2010 | Izu | F16G 1/28 474/205 |
| 2010/0133046 | A1 * | 6/2010 | Allwardt | B66B 7/123 187/251 |
| 2011/0003659 | A1 * | 1/2011 | Wu | D03D 15/283 474/268 |
| 2012/0071286 | A1 * | 3/2012 | Pasch | B32B 5/022 156/137 |
| 2013/0059690 | A1 * | 3/2013 | Di Cesare | F16G 1/28 474/205 |
| 2014/0018501 | A1 * | 1/2014 | Yoshida | C08L 75/06 525/130 |
| 2014/0093729 | A1 * | 4/2014 | Furusawa | F16G 5/20 523/205 |
| 2014/0206487 | A1 * | 7/2014 | Tomobuchi | C08J 5/046 474/205 |
| 2015/0111677 | A1 * | 4/2015 | Nishiyama | F16G 5/08 474/264 |
| 2016/0208889 | A1 * | 7/2016 | Yoshida | B32B 5/02 |
| 2017/0030431 | A1 * | 2/2017 | Duke, Jr. | F16G 5/20 |
| 2018/0313028 | A1 | 11/2018 | Tomoda | |
| 2021/0087389 | A1 * | 3/2021 | Katagiri | C08L 75/04 |

OTHER PUBLICATIONS

JP Office Action dated Nov. 24, 2021 as received in Application No. 2021539437.

* cited by examiner

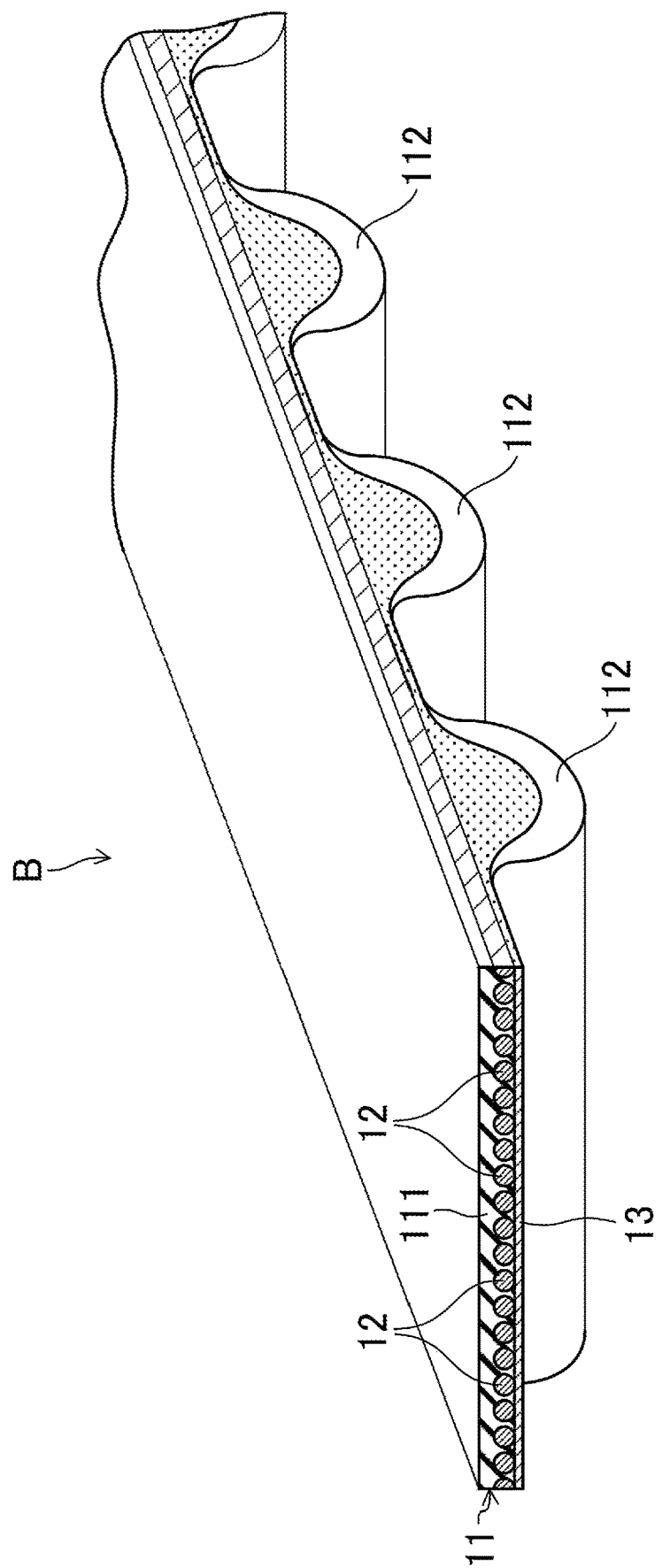

| UNIT : mm | |
|---|---|
| a | 0.686 |
| W | 5.20 |
| H | 2.83 |
| Rb | 4.04 |
| Rs | VARIABLE |
| r1 | 0.75 |
| r2 | 0.40 |

|  | EXAMPLE | FIRST COMPARATIVE EXAMPLE | SECOND COMPARATIVE EXAMPLE | THIRD COMPARATIVE EXAMPLE | FOURTH COMPARATIVE EXAMPLE | FIFTH COMPARATIVE EXAMPLE |
|---|---|---|---|---|---|---|
| BELT TENSION $T_{0.2}$ (N/mm) | 100 | 50 | 100 | 100 | 100 | 100 |
| AMOUNT OF BACKLASH(mm) | 0.16 | 0.1 | 0.08 | 0.65 | 0.16 | 0.16 |
| DEGREE OF RUBBER HARDNESS [JIS K 6253 DUROMETER TYPE A] | 92 | 92 | 92 | 92 | 87 | 92 |
| SURFACE DYNAMIC FRICTION COEFFICIENT | 0.65 | 0.65 | 0.65 | 0.65 | 0.65 | 1.65 |
| SHIFT AMOUNT (mm) | 0.72 | 1.56 | 4.21 | 1.35 | 1.21 | 2.78 |

TOOTHED BELT

CROSS-REFERENCE TO RELATED APPLICATION

This is a continuation of International Application No. PCT/JP2021/024922 filed on Jul. 1, 2021, which claims priority to Japanese Patent Application No. 2020-115532 filed on Jul. 3, 2020. The entire disclosures of these applications are incorporated by reference herein.

BACKGROUND

The present disclosure relates to a transmission system using a toothed belt.

Toothed belts using a core wire made of carbon fiber have been known. For example, in Japanese Unexamined Patent Publication No. 2005-24075, a toothed belt including a core wire made of carbon fiber embedded in a belt body made of rubber is described.

SUMMARY

A problem that is solved by the present disclosure is to provide a toothed belt with excellent positioning accuracy.

The present disclosure provides a transmission system using a toothed belt, the transmission system including a toothed belt including a belt body made of elastomer and a core wire made of carbon fiber and provided so as to be embedded in the belt body and form a helix having a pitch in a belt width direction and a toothed pulley meshed with the toothed belt, and, in the transmission system, the belt body includes a flat band portion having a horizontally long rectangular cross section and a plurality of tooth portions integrally provided on an inner peripheral side of the flat band portion, a belt tension $T_{0.2}$ per belt width of 1 mm when a belt elongation rate is 0.2% is 70 N/mm or more, an amount of backlash between the toothed belt and a toothed pulley is 0.10 mm or more and less than 0.65 mm, a hardness of the belt body is 89° or more in JIS K 6253 Durometer Type A, and a surface dynamic friction coefficient is 1.5 or less.

The belt body is preferably formed of a thermosetting elastomer and is more preferably formed of a thermosetting polyurethane resin.

A total number of filaments of carbon fiber forming the core wire is preferably 6000 or more and 48000 or less.

The core wire is preferably a single twisted yarn formed by twisting a filament bundle of carbon fiber in one direction.

A number of twists of the core wire of the single twisted yarn per length of 10 cm is preferably four times/10 cm or more and twelve times/10 cm or less.

The pitch is preferably 8 mm or more and 14 mm or less.

According to the present disclosure, the belt tension $T_{0.2}$ is 70 N/mm or more, the amount of backlash between the toothed belt and the toothed pulley is 0.10 mm or more and less than 0.65 mm, the hardness of the belt body is 89° or more in JIS K 6253 Durometer Type A, and the surface dynamic friction coefficient is 1.5 or less. Therefore, a transmission system using a toothed belt in which a shift amount is small and a positioning accuracy is excellent can be achieved.

BRIEF DESCRIPTION OF THE DRAWINGS

FIG. 1A is a perspective view of a piece of a toothed belt according to an embodiment.

DETAILED DESCRIPTION

Embodiments will be described in detail below with reference to the accompanying drawings.

Figure 1B:
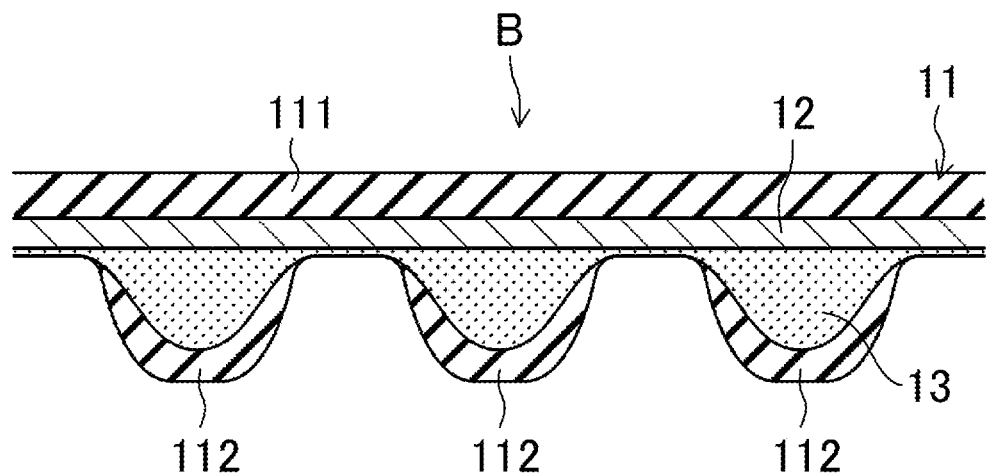
FIG. 1B is a longitudinal sectional view of a portion of the toothed belt according to the embodiment.
Figure 4:
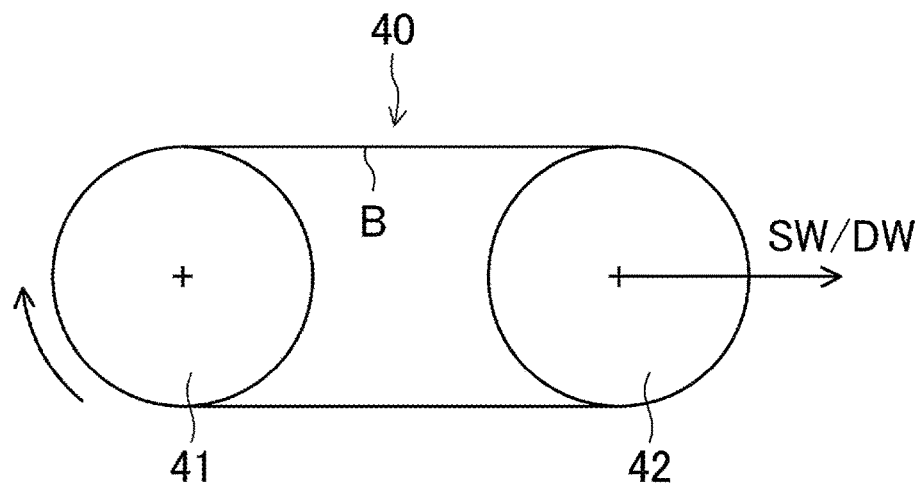
FIG. 4 is a pulley layout diagram of a belt shift amount measurement test machine that represents a transmission system using a toothed belt.

FIG. 1A and FIG. 1B illustrate a toothed belt B according to an embodiment. The toothed belt B according to the embodiment is a meshing toothed belt and is preferably used for a transmission system for use in high load transmission of, for example, a machine tool, a printing machine, a textile machine, an injection molding machine, or the like. For example, as illustrated in FIG. 4, a transmission system 40 using the toothed belt B includes a driving pulley 41 a driving force of which is transmitted by an unillustrated actuator and a driven pulley 42 connected to an unillustrated auxiliary machine or the like. The toothed belt B according to the embodiment is wound around the toothed pulleys 41 and 42. The toothed belt B has a length of, for example, 500 mm or more and 3000 mm or less. The toothed belt B has a width of, for example, 10 mm or more and 200 mm or less. The toothed belt B has a (maximum) thickness of, for example, 3 mm or more and 20 mm or less.

The toothed belt B according to the embodiment includes an endless toothed belt body 11 made of elastomer formed of a polyurethane resin. The toothed belt body 11 includes a flat band portion 111 having a horizontally long rectangular cross section and a plurality of tooth portions 112 integrally provided on an inner peripheral side of the flat band portion 111. The plurality of tooth portions 112 are provided at intervals at specific uniform pitches in a belt length direction.

Examples of a tooth shape of the tooth portion 112 when viewed from side include, for example, an STS tooth shape with both sides each outwardly protruding in an arc shape, a trapezoidal tooth shape, or the like. A number of tooth portions 112 is, for example, 30 or more and 400 or less. A tooth width of each tooth portion 112 (a maximum dimension in the belt length direction) is, for example, 2 mm or more and 10 mm or less. A tooth height of each tooth portion 112 is, for example, 2 mm or more and 8 mm or less. A pitch between the tooth portions 112 is, for example, 8 mm or more and 14 mm or less.

A material forming the toothed belt body 11 is preferably a thermosetting elastomer. The material is more preferably a thermosetting polyurethane resin. The polyurethane resin is obtained by curing a urethane composition formed by compounding a compounding agent, such as a curing agent, a plasticizer, or the like, with a urethane prepolymer by heating and pressurizing.

The urethane prepolymer is a relatively low molecular weight urethane compound with a plurality of NCO groups at a terminal thereof obtained through a reaction of isocyanate component and a polyol component. Examples of the isocyanate component include, for example, tolylene diisocyanate (TDI), diphenylmethane diisocyanate (MDI), or the like. Examples of the polyol component include, for example, polytetramethylene ether glycol (PTMG) or the like. The urethane prepolymer may be formed of a single urethane compound and may be formed of a mixture of a plurality of urethane compounds.

Examples of the curing agent include, for example, an amine compound, such as 1,4-phenylenediamine, 2,6-diaminotoluene, 1,5-naphthalenediamine, 4,4'-methylenedianiline, 3,3'-dichloro-4,4'-diaminodiphenyl methane (MOCA), or the like, or the like. The curing agent preferably includes one or two or more of the above-described compounds. An amine compound curing agent is preferably compounded such that an a value ($NH_2$ groups/NCO groups) that is a ratio of a number of moles of the $NH_2$ groups in the curing agent to a number of moles of NCO groups in the polyurethane prepolymer is 0.70 or more and 1.10 or less.

Examples of the plasticizer include, for example, dialkyl phthalate, such as dibutyl phthalate (DBP), dioctyl phthalate (DOP) or the like, dialkyl adipate, such as dioctyl adipate (DOA) or the like, dialkyl sebacate, such as dioctyl sebacate (DOS) or the like, or the like. The plasticizer preferably includes one or two or more of the above-described compounds. A compounding amount of the plasticizer is, for example, 3 parts by mass or more and 20 parts by mass or less per 100 parts by mass of the urethane prepolymer.

Other compounding agents include, for example, a colorant, an antifoaming agent, a stabilizer, or the like.

A hardness of the polyurethane resin forming the toothed belt body 11 is 89° or more and 100° or less. The hardness of the polyurethane resin is measured based on JIS K 6253 Durometer Type A. However, the hardness may be measured from a belt body side surface portion. At this time, the belt width is 10 mm or more.

The toothed belt B according to the embodiment includes a core wire 12 made of carbon fiber embedded in the flat band portion 111 of the toothed belt body 11. From a viewpoint of obtaining excellent durability in high load transmission, an outer diameter of the core wire 12 is preferably 0.6 mm or more and 2.2 mm or less and is more preferably 0.8 mm or more and 1.2 mm or less.

From a viewpoint of obtaining excellent durability in high load transmission, the carbon fiber forming the core wire 12 is preferably PAN-based carbon fiber. From the same viewpoint, a filament diameter of the carbon fiber is preferably 4 μm or more and 9 μm or less and is more preferably 6 μm or more and 8 μm or less.

From a viewpoint of obtaining excellent durability in high load transmission, a total number of filaments of the carbon fiber of the core wire 12 is preferably 6000 (6K) or more and 48000 (48K) or less, is more preferably 9000 (9K) or more and 18000 (18K) or less, and is further more preferably 12000 (12K). From the same viewpoint, a fineness of the carbon fiber forming the core wire 12 is preferably 400 tex or more and 3200 tex or less, is more preferably 600 tex or more and 1200 tex or less, and is further more preferably 800 tex.

From a viewpoint of obtaining excellent durability in high load transmission, the core wire 12 is preferably a twisted yarn. Examples of the twisted yarn forming the core wire 12 include a single twisted yarn, a piled yarn, or a Lang-lay yarn. From the same viewpoint, the core wire 12 of a twisted yarn is preferably a single twisted yarn formed by twisting a filament bundle of carbon fiber in one direction. From the same viewpoint, a number of twists of the core wire 12 of a single twisted yarn is preferably four times/10 cm or more and twelve times/10 cm or less and is more preferably six times/10 cm or more and ten times/10 cm or less. For the core wire 12 of a single twisted yarn, an S-twisted yarn may be used, a Z-twisted yarn may be used, and both an S-twisted yarn and a Z-twisted yarn may be used.

The core wire 12 is provided to form a helix having a pitch in a belt width direction. The core wire 12 may be formed of two yarns, that is, an S-twisted yarn and a Z-twisted yarn, and the two yarns may be provided to form a double helix. The core wires 12 are later disposed to extend in parallel to each other at intervals in the belt width direction. At this time, from a viewpoint of obtaining excellent durability in high load transmission, a number of the core wires 12 per belt width of 10 mm is preferably six/10 mm or more and ten/10 mm or less and is more preferably seven/10 mm or more and nine/10 mm or less.

It is preferable that bonding processing, such as processing of performing immersion in a liquid adhesive and then drying, or like processing, is performed on the core wire 12 in advance before shaping.

The toothed belt B according to the embodiment includes a nonwoven fabric 13 embedded along the belt length direction in a more inner peripheral side than a position in which the core wire 12 is embedded in a belt thickness direction in the toothed belt body 11. The nonwoven fabric 13 may be formed of a single sheet and may be formed of a plurality of sheets.

The nonwoven fabric 13 contains a polyurethane resin forming the toothed belt body 11 and is provided to form a layer when viewed from side. Each of portions of the nonwoven fabric 13 corresponding to the tooth portions 112 enters into a corresponding one of the tooth portions 112 so as to protrude toward the inner peripheral side and extends with a large thickness in a belt thickness direction when viewed from side. Each portion of the nonwoven fabric 13 corresponding to a portion between the tooth portions 112 is compressed to be in contact with the core wire 12 and to be thin in the belt thickness direction.

Examples of a fiber material forming the nonwoven fabric 13 include, for example, nylon fiber, polyester fiber, aramid fiber, polyketone fiber, carbon fiber, or the like. The nonwoven fabric 13 may be formed of a single type of a fiber material and may be formed of a plurality of types of fiber materials.

It is preferable that bonding processing, such as processing of performing immersion in a liquid adhesive and then drying, or like processing, is performed on the nonwoven fabric 13 in advance before shaping.

The toothed belt B according to the embodiment is configured such that a belt tension $T_{0.2}$ per belt width of 1 mm when a belt elongation rate is 0.2% is 70 N/mm or more. From a viewpoint of obtaining excellent durability in high load transmission, the belt tension $T_{0.2}$ is preferably 80 N/mm or more and is more preferably 90 N/mm or more. From a viewpoint of avoiding increasing flexural rigidity and thus impairing flexural fatigue resistance, the belt tension $T_{0.2}$ is preferably 140 N/mm or less and is more preferably 120 N/mm or less.

The toothed belt B according to the embodiment is configured such that an amount of backlash between the toothed belt B and a corresponding toothed pulley when the toothed belt B and the toothed pulley completely mesh with each other is 0.10 mm to 0.75 mm. That is, when the amount of backlash is neither too large nor too small, a shift amount is appropriate. A surface dynamic friction coefficient of the toothed belt B is 1.5 or less. This is because, when the surface dynamic friction coefficient is too large, teeth are deformed.

Herein, the belt tension $T_{0.2}$ is obtained as follows.

Figure 2:
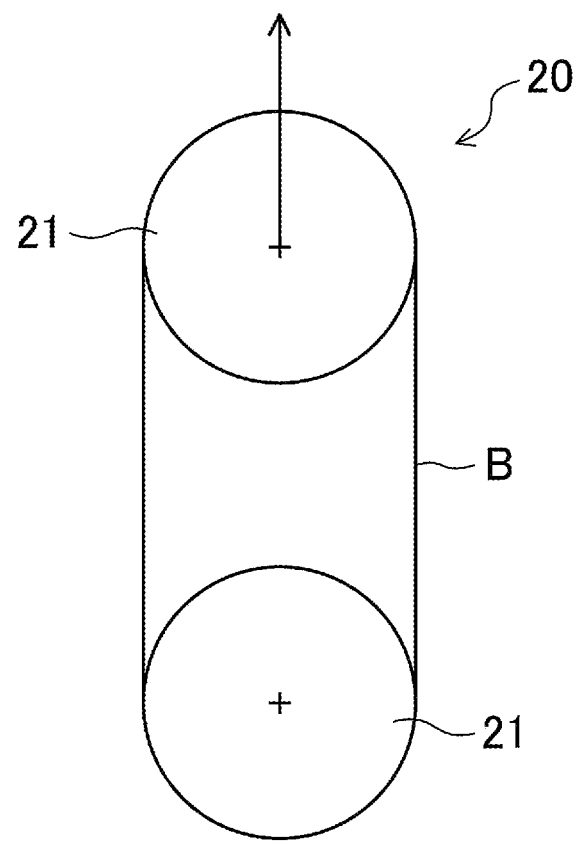
FIG. 2 is a diagram illustrating a configuration of a belt tensile test machine.

First, in an atmosphere at a temperature of 25° C., as illustrated in FIG. 2, the toothed belt B according to the embodiment is wound such that a back surface of the toothed belt B contacts a pair of flat pulleys 21 of a belt tensile test machine 20, each of the flat pulleys 21 having a pulley diameter of 95.4 mm.

Subsequently, one of the flat pulleys 21 is separated from the other one of the flat pulleys 20 at speed of 50 mm/min. At this time, a relationship between a displacement between the pair of flat pulleys 21 and a tension detected via either one of the pair of flat pulleys 21 is recorded.

Then, the displacement between the pair of flat pulleys 21 is converted to the belt elongation rate by calculating a belt elongation amount by doubling the displacement between the pair of flat pulleys 21 and dividing the calculated belt elongation amount by a belt length of the toothed belt B according to the embodiment under no-load condition. The detected tension is converted to a belt tension per belt width of 1 mm by calculating the belt tension by dividing the detected tension by 2 and dividing the calculated belt tension by the belt width of the toothed belt B according to the embodiment.

Then, based on a relationship between the belt elongation rate and the belt tension, zero correction is performed such that a point in which the belt tension per belt width of 1 mm is 50 N is a starting point, so that the belt tension $T_{0.2}$ is obtained.

According to the toothed belt B according to the embodiment having the above-described configuration, the belt tension $T_{0.2}$ is 70 N/mm or more, so that a modulus of elasticity is high and a pitch line is less likely to be shifted. The hardness of the belt body is 89° or more in JIS K 6253 Durometer Type A, so that the belt body is not too soft. The surface dynamic friction coefficient is 1.5 or less, so that the toothed belt B appropriately slips. Moreover, the amount of backlash between the toothed belt B and the toothed pulley is 0.10 mm or more and less than 0.65 mm, so that positioning accuracy is extremely increased.

Next, a method for manufacturing the toothed belt B according to the embodiment will be described.

Figure 3A:
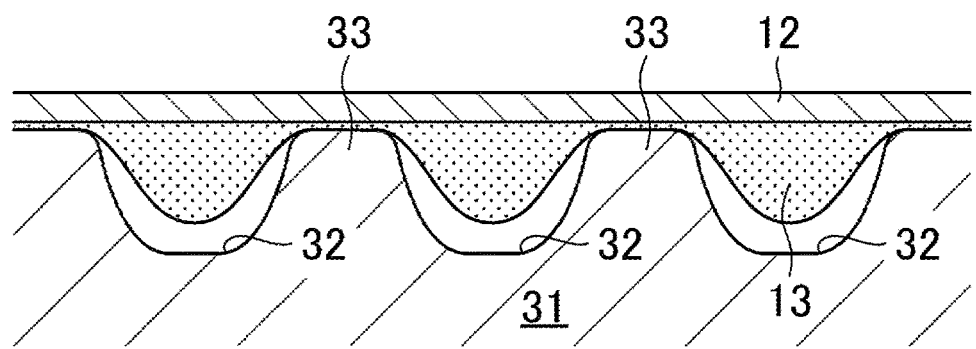
FIG. 3A is a first explanatory view illustrating a method for manufacturing a toothed belt according to an embodiment.

First, as illustrated in FIG. 3A, a cylindrical inner mold 31 is covered with the nonwoven fabric 13 and the core wire 12 is spirally wound therearound. At this time, recessed grooves 32 each having a cross section with a shape corresponding to the corresponding tooth portion 112 and extending in an axial direction are provided at intervals in a circumferential direction at constant pitches on an outer periphery of the inner mold 31, and also, ridges 33 each extending in the axial direction between corresponding adjacent ones of the recessed grooves 32 are formed. Therefore, the nonwoven fabric 13 and the core wire 12 are provided so as to be supported by the ridges 33.

Figure 3B:
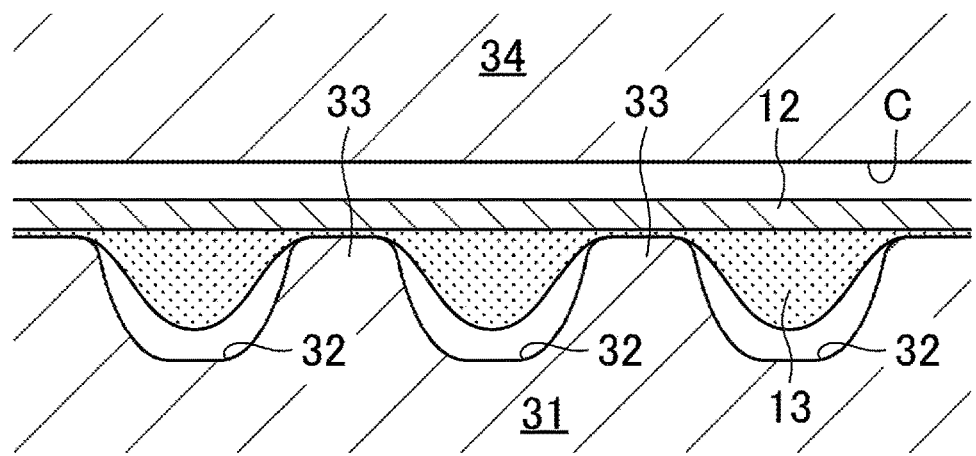
FIG. 3B is a second explanatory view illustrating the method for manufacturing a toothed belt according to the embodiment.

Subsequently, as illustrated in FIG. 3B, the inner mold 31 is placed in a cylindrical outer mold 34. At this time, a cavity C used for forming a toothed belt body is formed between the inner mold 31 and the outer mold 34.

Figure 3C:
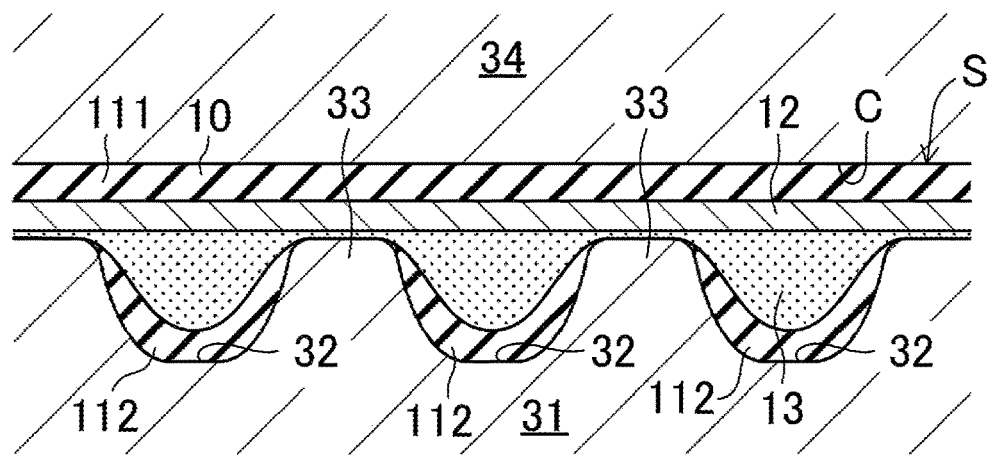
FIG. 3C is a third explanatory view illustrating the method for manufacturing a toothed belt according to the embodiment.

Then, as illustrated in FIG. 3C, a liquid urethane composition obtained by compounding a compounding agent with polyurethane prepolymer is injected into the sealed cavity C to fill the cavity C with the urethane composition and is heated. At this time, the urethane composition flows and hardens, so that the toothed belt body 11 of a polyurethane resin is formed. The tooth portions 112 are formed in the recessed grooves 32. The core wire 12 is bonded to the toothed belt body 11 and is embedded. Furthermore, while the nonwoven fabric 13 is impregnated with the urethane composition and hardens, the nonwoven fabric 13 is bonded to the toothed belt body 11 and is embedded. As has been described above, the toothed belt body 11, the core wire 12, and the nonwoven fabric 13 are integrated together to form a cylindrical belt slab S.

Finally, the belt slab S is removed from the inner mold 31 and the outer mold 34 and is cut into round slices, and thus, the toothed belt B according to the embodiment is obtained.

In the above-described embodiment, the toothed belt B is formed of the toothed belt body 11, the core wire 12, and the nonwoven fabric 13. However, the toothed belt B is not particularly limited thereto, and a reinforcing cloth may be provided on a tooth portion side surface at an inner peripheral side of a toothed belt body and/or on a back surface at an outer peripheral side of the toothed belt body.

In the above-described embodiment, the toothed belt B in which the toothed belt body is formed of a polyurethane resin has been described. However, the toothed belt B is not particularly limited thereto and the belt body may be formed of a crosslinked rubber composition.

EXAMPLES (Toothed Belt)

Figure 5:
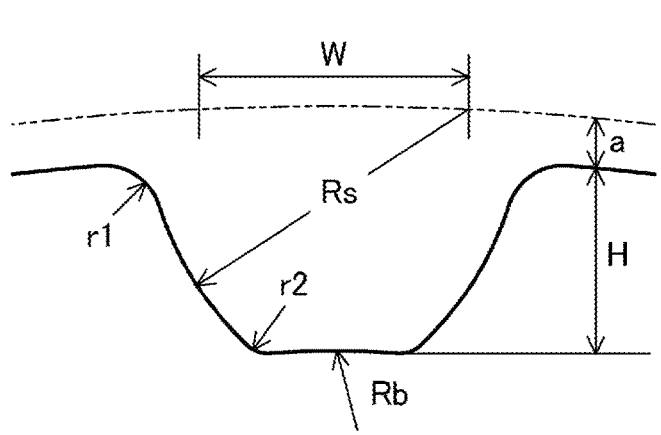
FIG. 5 is a partial enlarged front view illustrating a driving pulley and a driven pulley.

Toothed belts of an example and first to fifth comparative examples were produced. Respective configurations thereof are illustrated in FIG. 5.

Example

A toothed belt having an STS tooth shape and having a similar configuration to that of the above-described embodiment was used as an example.

The toothed belt of the example had a belt length of 800 mm, a belt width of 10 mm, and a (maximum) belt thickness of 4.8 mm. A tooth portion was S8M defined in ISO13050: 2014(E) and a pitch between the tooth portions was 8 mm.

As a urethane composition used for forming a toothed belt body, a composition obtained by compounding 13 parts by mass of 3,3'-dichloro-4,4'-diaminodiphenyl methane as a curing agent and 10 parts by mass of dioctyl phthalate as a plasticizer to 100 parts by mass of a urethane prepolymer was used. A JIS-A hardness of a polyurethane resin forming the toothed belt body that was measured based on JIS K7312 was 92°.

As for a core wire, a single twisted yarn formed by twisting a filament bundle of carbon fiber (Tenax-J UTS50 F22 manufactured by Teijin Limited, 12K, 800 tex, filament diameter: 7.0 μm) including 12000 filaments six times/10 cm per 10 cm in one direction was used. For the core wires of the single twisted yarns, S-twisted yarns and Z-twisted yarns were prepared, and bonding processing of performing immersion in an adhesive and then drying was performed thereon. The core wires of the single twisted yarns of the S-twisted yarns and the Z-twisted yarns were provided such that the S-twisted yarns and the Z-twisted yarns were alternated in a belt width direction to form a double helix. A number of the core wires per belt width of 10 mm was eight. An outer diameter of each core wire was 0.9 mm.

As a nonwoven fabric, a nonwoven fabric of nylon fiber produced by needle punching without pressurizing was used. Bonding processing was not performed on the nonwoven fabric. Needle punching is a method in which piercing a plurality of needles each having a hook into a fabric web with directions of fibers almost aligned in a perpendicular direction to the fabric web and pulling up the needles from the fabric web were repeated to entangle the fibers in the fabric web, thereby forming a sheet-shaped nonwoven fabric.

(Belt Shift Amount Measurement Test Method)

FIG. 4 illustrates a pulley layout of a belt shift amount measurement test machine 40 that represents a transmission system using a toothed belt. The belt shift amount measurement test machine 40 includes a driving pulley 41 having 24 teeth and a driven pulley 42 having 24 teeth provided at a right side of the driving pulley 41. The driven pulley 42 is configured such that the driven pulley 42 can move right and left and an axial load is imposed on the driven pulley 42 and is also configured such that a load torque is applied to the driven pulley 42.

Each of respective toothed belts B of the example and the first to fifth comparative examples was wound between the driving pulley 41 and the driven pulley 42 in an atmosphere at room temperature. As for belt size, the belt length was 800 mm, the belt width was 10 mm, and the pitch between the toothed portions was 8 mm, and the rotation speed was 1800 rpm. A fixed axial load (SW) of 300 N was imposed on the driven pulley 42 to give a tension to each of the toothed belts B, and a load torque of 10 N·m was applied to the driven pulley 42 and, while keeping that state, the driving pulley 41 was rotated at rotation speed of 1800 rpm. A driving shaft motor was rotated normally (clockwise) ten times and was rotated reversely (counterclockwise) ten times, and a shift angle of a driven shaft when the driving shaft motor returned to an original position was measured and the belt shift amount was calculated.

(Backlash Measurement Method)

Backlash measurement was performed with a load DW of 441 N (45 kgf) applied to the driven pulley 42 without a load torque, with the same belt size as that in FIG. 4, that is, a belt length of 800 mm, a belt width of 10 mm, and a pitch of 8 mm between tooth portions, and at room temperature, while the belt was standing still. FIG. 5 illustrates a partially enlarged view of the driving pulley 41 and the driven pulley 42.

Each of the respective toothed belts B of the example and the first to fifth comparative examples was wound between the driving pulley 41 and the driven pulley 42 in an atmosphere at room temperature. The toothed belt B was manually rotated three times and a number of meshed teeth of the driven pulley 42 and a backlash of a sixth tooth was measured. A position of measurement was a position at ½ of a height of the tooth. In a case where there were backlashes at left and right, a larger one of values at left and right was employed. An average value of r=3 was assumed as a backlash between the belt and a corresponding pulley.

(Dynamic Friction Coefficient Change Measurement Method)

Figures 6, 7:
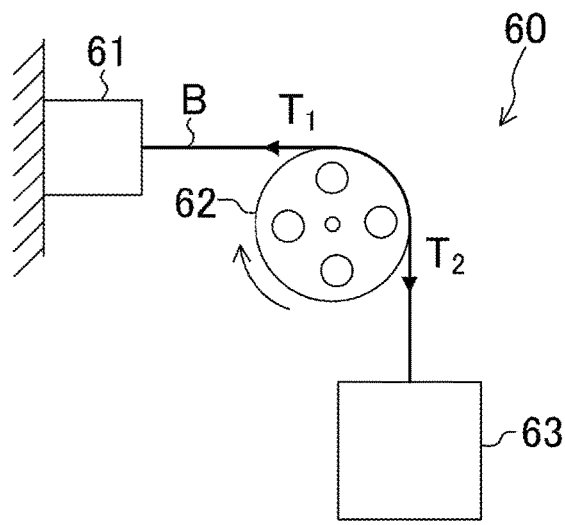
FIG. 6 is a pulley layout diagram of a dynamic friction coefficient change test machine.
FIG. 7 is a table illustrating respective configurations of toothed belts of an example and first to fifth comparative examples.

FIG. 6 illustrates a configuration of a dynamic friction coefficient measurement apparatus 60 that measures a dynamic friction coefficient of the toothed belt B.

The dynamic friction coefficient measurement apparatus 60 includes a load cell 61 fixedly attached to a vertical wall and a flat pulley 62 provided at a side of the load cell 61. A material of the flat pulley is SUS304 and a surface roughness is 6.3 S or less.

A strip-like test piece having a length of 600 mm and a width of 10 mm was cut out from each of the respective toothed belts B of the example and the first to fifth comparative examples. One end of the test piece was fixed to the load cell 61 and is horizontally stretched to be wound around the flat pulley 62 having a diameter of 60 mm such that a tooth tip and the flat pulley 62 are in contact with each other. A weight 63 having a weight of 1.75 kg was hung from the other end to impose a load of 17.2 N and, while keeping that state, the flat pulley 62 was rotated in a direction in which the load cell 61 was pulled at rotation speed of 42 rpm. A load cell value after elapse of 30 seconds from a start of rotation was read and a dynamic friction coefficient µ' was calculated. The dynamic friction coefficient µ' was calculated based on an expression below. An average value of r=3 was calculated. T1 is a measurement value for the load cell 61 and represents a stretched side tension. T2 is a load of the weight 63 and represents a loose side tension.

$$\mu'=\ln(T_1/T_2)/(\pi/2) \quad \text{[Expression 1]}$$

$T_1$: A tension of a belt measured by a load cell
$T_2$: A tension generated in the belt by a weight (Test Results)

Test results are illustrated in FIG. 5. A belt tension $T_{0.2}$ of the toothed belt of the example was 100 N/mm. An amount of backlash between the toothed belt and the toothed pulley was 0.16 mm. A surface dynamic friction coefficient was 0.65 and a shift amount was 0.72 mm.

First Comparative Example

A toothed belt having the same configuration as that of the example except that the belt tension $T_{0.2}$ was low, that is, 50 N/mm, and the amount of backlash was 0.1 mm was used as a first comparative example.

The shift amount of the toothed belt of the first comparative example was 1.56 mm. Accordingly, for the toothed belt of the first comparative example, it was found that the modulus of elasticity was too low, the belt was stretched to increase the shift amount, and positioning accuracy was low.

Second Comparative Example

A toothed belt having the same configuration as that of the example except that the amount of backlash was small, that is, 0.08 mm, was used as a second comparative example.

For the toothed belt of the second comparative example, it was found that the shift amount was extremely large, that is, 4.21 mm. It was found that, when the amount of backlash was too small, as described above, the belt did not mesh with the pulley and ran on the pulley.

Third Comparative Example

A toothed belt having the same configuration as that of the example except that the amount of backlash was large, that is, 0.65 mm, was used as a third comparative example.

As seen in the toothed belt of the third comparative example, it was found that, when the amount of backlash was too large, the shift amount was large, that is, 1.35, and the positioning accuracy was deteriorated.

Fourth Comparative Example

A toothed belt having the same configuration as that of the example except that a rubber hardness was low, that is, 87, was used as a fourth comparative example.

As seen in the toothed belt of the fourth comparative example, it was found that, when the rubber hardness was too low, teeth were deformed and the positioning accuracy was deteriorated.

Fifth Comparative Example

A toothed belt having the same configuration as that of the example except that the surface dynamic friction coefficient was high, that is, 1.65, was used as a fifth comparative example.

As seen in the toothed belt of the fifth comparative example, it was found that, when the surface dynamic friction coefficient was too high, teeth were deformed and the positioning accuracy was deteriorated.

As described above, it was found that, in the example, the shift amount was smaller than those in the first to fifth comparative examples and the positioning accuracy was extremely excellent.

What is claimed is:

1. A transmission system using a toothed belt, the transmission system comprising:
    a toothed belt including a belt body made of elastomer and a core wire made of carbon fiber and provided so as to be embedded in the belt body and form a helix having a pitch in a belt width direction; and
    a toothed pulley meshed with the toothed belt,
    wherein
    the belt body includes a flat band portion having a horizontally long rectangular cross section and a plurality of tooth portions integrally provided on an inner peripheral side of the flat band portion,
    the core wire is a single twisted yarn formed by twisting a filament bundle of carbon fiber forming the core wire in one direction,
    a number of twists of the core wire of the single twisted yarn per length of 10 cm is four times/10 cm or more and twelve times/10 cm or less, and
    a belt tension $T_{0.2}$ per belt width of 1 mm when a belt elongation rate is 0.2% is 70 N/mm or more, an amount of backlash between the toothed belt and a toothed pulley is 0.10 mm or more and less than 0.65 mm, a hardness of the belt body is 89° or more in JIS K 6253 Durometer Type A, and a surface dynamic friction coefficient is 1.5 or less.

2. The transmission system using a toothed belt according to claim 1, wherein
    the belt body is formed of a thermosetting elastomer.

3. The transmission system using a toothed belt according to claim 2, wherein
    the belt body is formed of a thermosetting polyurethane resin.

4. The transmission system using a toothed belt according to claim 1, wherein
    a total number of filaments of carbon fiber forming the core wire is 6000 or more and 48000 or less.

5. The transmission system using a toothed belt according to claim 1, wherein
    the pitch is 8 mm or more and 14 mm or less.

* * * * *